United States Patent
Caldwell

(10) Patent No.: US 7,085,296 B2
(45) Date of Patent: Aug. 1, 2006

(54) DUAL PARAMETER LASER OPTICAL FEEDBACK

(75) Inventor: Scott Caldwell, Fairport, NY (US)

(73) Assignee: Branson Ultrasonics Corporation, Danbury, CT (US)

(*) Notice: Subject to any disclaimer, the term of this patent is extended or adjusted under 35 U.S.C. 154(b) by 154 days.

(21) Appl. No.: 10/729,053

(22) Filed: Dec. 5, 2003

(65) Prior Publication Data
US 2005/0123009 A1     Jun. 9, 2005

(51) Int. Cl.
*H01S 3/00* (2006.01)
*H01S 3/13* (2006.01)
*G01J 1/32* (2006.01)

(52) U.S. Cl. ............... 372/38.01; 372/29.011; 250/205

(58) Field of Classification Search ............ 372/38.01
See application file for complete search history.

(56) References Cited

U.S. PATENT DOCUMENTS

| 4,636,609 A | 1/1987 | Nakamata ............... 219/121.6 |
| 2004/0227056 A1* | 11/2004 | Neuberger et al. .......... 250/205 |

* cited by examiner

*Primary Examiner*—Armando Rodriguez
(74) *Attorney, Agent, or Firm*—Harness, Dickey & Pierce, P.L.C.

(57) ABSTRACT

A method and apparatus for feedback control of a laser, which includes outputting a laser beam from the laser to an optical bundle. The intensity of the laser beam is measured at a point between the laser and the optical bundle and a raw feedback signal is output in response thereto. The raw feedback signal is multiplied by a laser calibration factor and an optical bundle calibration factor and output as an adjusted feedback signal. A controller is then used to control the intensity of the laser in response to the adjusted feedback signal.

14 Claims, 2 Drawing Sheets

DUAL PARAMETER LASER OPTICAL FEEDBACK

FIELD OF THE INVENTION

The present invention relates generally to laser welding and, more particularly, relates to a dual parameter feedback system for calibrating laser output energy.

BACKGROUND AND SUMMARY OF THE INVENTION

Laser welding is commonly used to join plastic or resinous parts, such as thermoplastic parts, at a welding zone. An example of such use of lasers can be found in U.S. Pat. No. 4,636,609, which is expressly incorporated herein by reference.

As is well known, lasers provide a semi-focused beam of electromagnetic radiation at a specified frequency (i.e., coherent monochromatic radiation). There are a number of types of lasers available; however, infrared lasers or non-coherent sources provide a relatively economical source of radiative energy for use in heating a welding zone. One particular example of infrared welding is known as Through-Transmission Infrared (TTIr) Welding. TTIr welding employs an infrared laser capable of producing infrared radiation that is directed by lenses, diffractive optics, fiber optics, waveguides, lightpipes, or lightguides through a first plastic part and into a second plastic part. This first plastic part is often referred to as the transmissive piece, since it generally permits the laser beam from the laser to pass therethrough. However, the second plastic part is often referred to as absorptive piece, since this piece generally absorbs the radiative energy of the laser beam to produce heat in the welding zone. This heat in the welding zone causes the transmissive piece and the absorptive piece to be melted and, with intimate contact, welded together.

Often times, multiple laser beams produced from multiple laser and optical bundle assemblies may be used to weld a single zone. That is, in simultaneous plunge welding, multiple laser sources are used to simultaneously produce a single weld at a specific weld zone. The laser beam from each of the multiple laser sources is delivered to the weld zone by an individual fiber optic bundle, lightguide, and or waveguide (hereinafter collectively referred to an optical bundle). It should be understood that each specific laser source and bundle assembly produces a unique laser output intensity that is a byproduct of the unique characteristics of the laser source and bundles used.

It is frequently desirable to interchange various bundles with different laser sources to produce a desired effect. However, as one skilled in the art will recognize, interchanging a bundle with a different laser source will again produce a unique combination have a different laser output. Typically, it is required that this new combination of laser source and bundle be recalibrated so the exact laser output intensity is known so as to avoid undesired welds. Thus, it is desirable to be able to readily swap bundles with individual laser sources without having to recalibrate each bundle to each laser. This would permit quick and simplified tooling modifications, without the need for costly down time.

It is known to use a single optical sensor positioned near the laser source to provide output energy information. However, this output energy information is only useful when calibrated relative to the laser and bundle being used. Therefore, with a single sensor arrangement, the laser source and bundle assembly still require lengthy delays during calibration.

If one chooses not to calibrate the laser source and bundle assembly, excessive statistical error is introduced. As seen in FIG. 1, when one uses a single optical sensor positioned near the laser source and swaps between bundles, the standard deviation of the raw feedback signal without a calibration factor has been found to be about 57%, as shown in FIG. 1. Obviously, for most applications, this standard deviation is unacceptable. As mentioned above, this deviation could be eliminated by calibration of each laser source and bundle combination. But given the number of interchangeable bundles between various laser sources and machines in a typical commercial application, it is not practical to calculate the calibration factor for every possible combination.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses. However, it should be understood that although the present invention is discussed in connection with specific types of equipment, such as lasers, photo detectors, and bundles, the present invention should not be interpreted as being so limited. The dual parameter feedback control of the present invention may be used with any laser, any photo detector, or any circuit. Additionally, the present invention may be used for laser plastics welding or for control of a laser in any other application.

Figure 2:
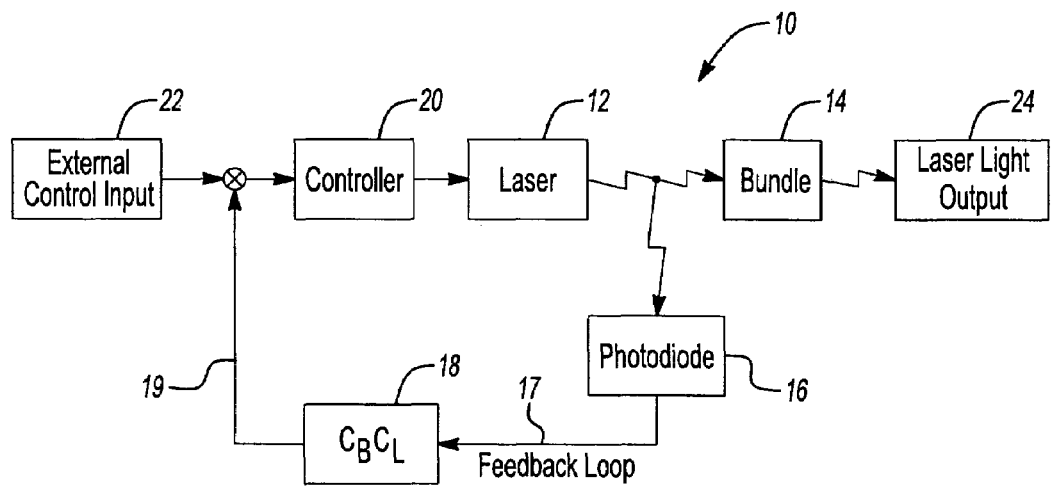
FIG. 2 is a schematic view illustrating a feedback control system using a dual feedback parameter system according to the principles of the present invention.

Referring to FIG. 2, a feedback control device 10 is illustrated for use with a conventional laser source 12, such as a laser diode, and optical bundle 14. Feedback control device 10 is feedback loop capable of controlling the output of laser source 12. Laser source 12 may be any conventional laser. Similarly, optical bundle 14 may include any number or combination of conventional optical members or laser light transmitters/reflectors, such as, but not limited to, fiber optics, waveguides, and lightguides. The present invention should not be regarded as being limited to the specific optical members or lasers used.

Feedback control device 10 employs a single optical sensor 16, such as a solid state infrared photodiode, positioned between the outlet of laser source 12 and the inlet of optical bundle 14. Optical sensor 16 is operable to measure the intensity of laser energy output from laser source 12. Optical sensor 16 outputs a raw feedback signal 17, specifically an analog signal, in response to the measured laser energy intensity.

A processing unit 18 receives raw feedback signal 17 and multiplies raw feedback signal 17 by a pair of calibration factors to produce an adjusted feedback signal 19. The pair of calibration factors include a laser calibration factor, $C_L$, and a bundle calibration factor, $C_B$. The adjusted feedback signal is then sent back to a controller 20, preferably a digital IC controller, which adjusts the output of laser source 12 through voltage pulsing of the DC current supply to the laser source 12 in response to the adjusted feedback signal. An external or user control 22 is also operably coupled to controller 20 to vary a preferred laser output 24.

The following procedure and equations are used to determine the value of $C_L$ and $C_B$.

$$\overline{m_B} = \sum_{L=1}^{n} \frac{m_{LB}}{n}$$

$$\overline{m_L} = \sum_{B=1}^{p} \frac{m_{LB}}{\overline{m_B} p}$$

$$C_B = \frac{1}{\overline{m_B}}$$

$$C_L = \frac{1}{\overline{m_L}}$$

$$s = \sqrt{\frac{1}{(n-1)(p-1)} \sum_{L=1}^{n} \left( \sum_{B=1}^{p} \left( \frac{m_{LB}}{\overline{m_B}} - \overline{m_L} \right)^2 \right)}$$

Figure 3:
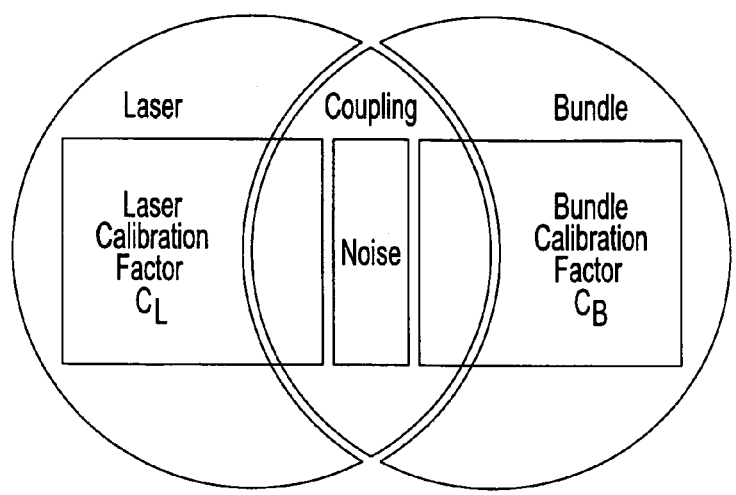
FIG. 3 is a Ven diagram of a laser and bundle combination illustrating that the laser calibration factor includes both laser efficiency and coupling and the bundle calibration factor includes both bundle throughput and coupling.

Where:
n=Number of Lasers
p=Number of Bundles
L=Laser Index
B=Bundle Index
$M_{LB}$=Slope of Individual Laser and Bundle Combination Responses
$C_B$=Bundle Calibration Factor for Each Bundle
$C_L$=Laser Calibration Factor for Each Laser
s=Standard Deviation of Irresolvable Noise Using the above equations, a matrix of slopes of various laser and bundle combinations, $m_{LB}$, are measured experimentally for a statistical sample. An external light power meter, used for calibration only, located at laser light output 24, is used to determine the measured laser power output of the system. The voltage of the measured raw feedback signal 17 is divided by the measured laser power output of the system to get the slope of the response, $m_{LB}$. Then the calibration factors $C_L$ and $C_B$ can be calculated by using the equations above. As schematically illustrated in FIG. 3, both $C_L$ and $C_B$ are statistically independent, but both include part of the information about the coupling between the laser sources and bundles. That is, part of the calibration factor of the laser source accounts for the efficiency of the laser, while part of the calibration factor of the bundle accounts for the throughput of the bundle. However, by using this statistical method, each calibration factor also accounts for the dependence of the lasers and bundles to the coupling efficiency between the lasers and bundles. The statistically dependent part of the coupling is irresolvable noise, which can be calculated using the final equation above.

Figure 1:
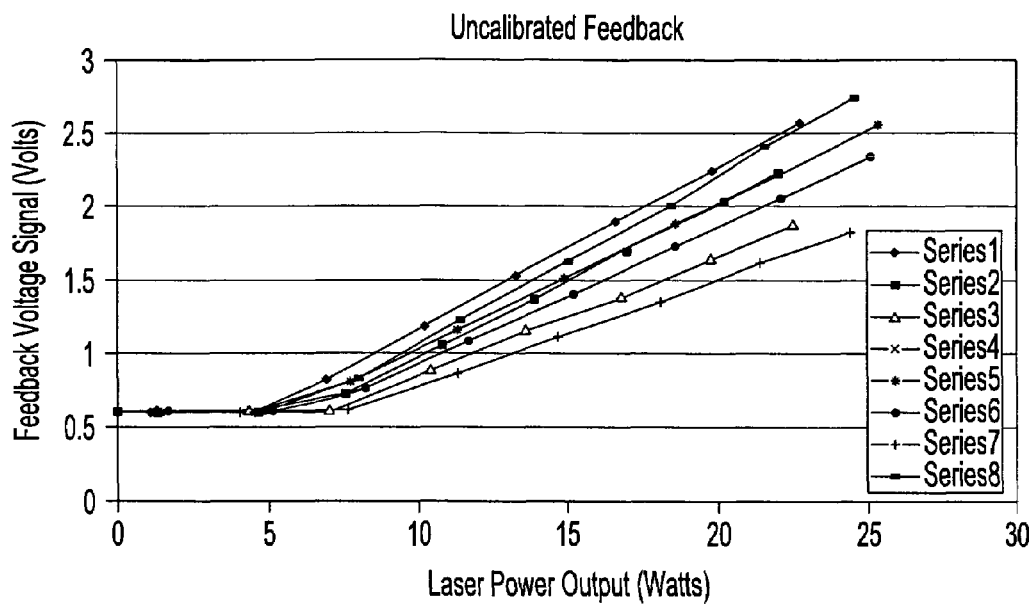
FIG. 1 is a graph illustrating the standard deviation of a conventional feedback control system for various laser and bundle combinations.
Figure 4:
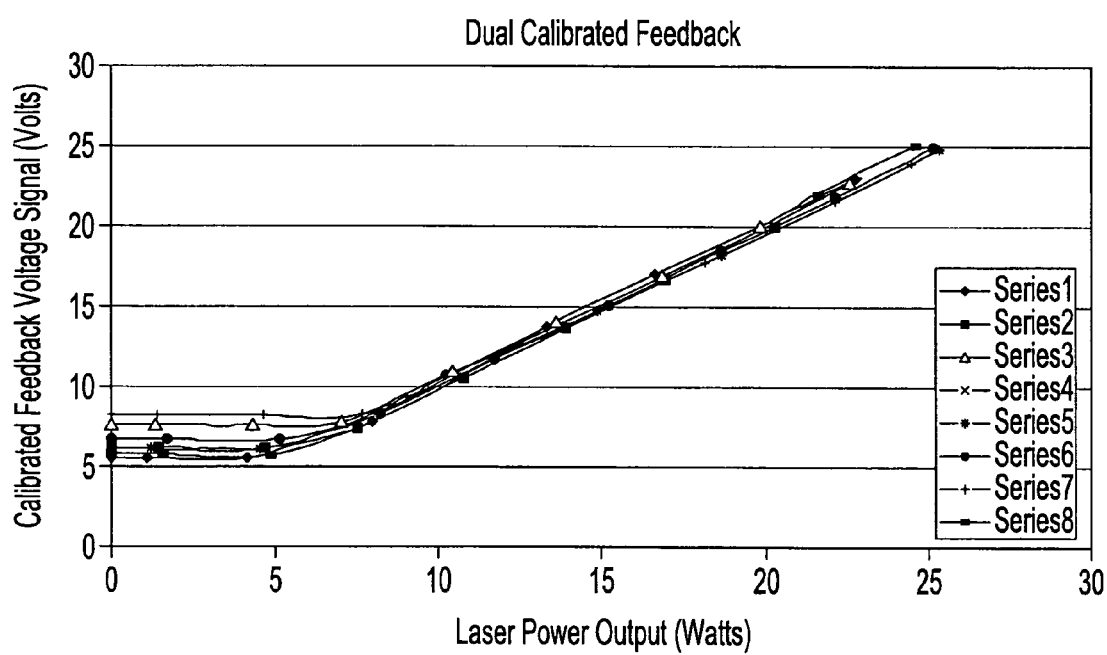
FIG. 4 is a graph illustrating the standard deviation of a dual parameter feedback control system for various laser and bundle combinations according to the principles of the present invention.

Once a statistical sample of laser source and bundle combinations has been measured to determine $C_L$ and $C_B$, any individual bundle or laser from the original statistical sample can be used to calibrate bundles and laser sources that were not originally in the statistical sample. It has been found that instead of having a single calibration factor as in the prior art, but having two calibration factors as in the present invention, the standard deviation has dropped from about 57% to 7%, as illustrated in comparing FIGS. 1 and 4. The remaining 7% standard deviation represents the noise of the variability of the coupling between different laser and bundle combinations that cannot be correlated to just a laser or to a bundle.

To achieve separate calibrations of additional lasers and bundles, after the statistical sample of combinations has been taken, any one of the original samples that has been calibrated can be used as a "gold standard" to calibrate others. Therefore a calibrated "gold standard" laser source can be used to calibrate any additional bundles outside the sample. Likewise, a precalibrated "gold standard" bundle can then be used to calibrate any additional laser source. The result is a laser intensity feedback system that allows for freely interchangeable tooling that varies by only up to about 7% from the true laser intensity delivered to the actual weld zone.

The present invention of statistical extraction of semi-dependent parameters in a feedback control system for use with a laser can be applied to two, three, or more parameters and can also be applied to any feedback system used so long as the parameters represent the overall throughput of some quantity such as, but not limited to, heat, light, power, fluid flow, mechanical motion, and the like. This extraction of parameters allows for free swapping of components that the parameters represent with a minimum of noise. This process eliminates the need to individually calibrate every combination of laser source and bundle, without introducing excessive statistical noise and/or standard deviation. In other words, laser sources and optic bundles can be swapped in an infrared laser plastics welding system using positive feedback control. Not all laser and bundle combinations need to be measured to allow for the initial calibration. This enables the use of different laser machines and laser bundle tools at different times and in different places, yet still allows laser bundle tooling swapping between machines. On a given single machine, the laser bundles from a tool can also be swapped between different laser channels allowing for reconfiguration of the tool without recalibration.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. A method of feedback control of a laser, said method comprising:
outputting a laser beam from said laser to an optical bundle;
measuring an intensity of said laser beam and outputting a raw feedback signal in response thereto;
determining a value of a laser calibration factor and an optical bundle calibration factor through a statistical sampling of a plurality of laser and optical bundle combinations, said laser calibration factor representing an attribute of said laser and an attribute of the coupling of said laser with a sample of optical bundles, said optical bundle calibration factor representing an attribute of said optical bundle and an attribute of the coupling of said optical bundle with a sample of lasers;

multiplying said raw feedback signal by said laser calibration factor and said optical bundle calibration factor and outputting an adjusted feedback signal; and controlling said laser in response to said adjusted feedback signal.

2. The method according to claim 1 wherein said determining the value of said laser calibration factor and said optical bundle calibration factor comprises:

measuring a response slope of said plurality of laser and optical bundle combinations; and calculating said laser calibration factor and said optical bundle calibration factor in response to said response slope of said plurality of laser and optical bundle combinations.

3. A method of feedback control of a first laser, said first laser being operably coupled to an optical bundle, said method comprising:

outputting a laser beam from said first laser to said optical bundle;

measuring an intensity of said laser beam and outputting a raw feedback signal in response thereto;

determining a value of a laser calibration factor and an optical bundle calibration factor through a statistical sampling of at least a second laser and at least a second optical bundle, said laser calibration factor representing an attribute of said first laser and an attribute of the coupling of said first laser with said second optical bundle, said optical bundle calibration factor representing an attribute of said optical bundle and an attribute of the coupling of said optical bundle with said second laser;

multiplying said raw feedback signal by said laser calibration factor and said optical bundle calibration factor and outputting an adjusted feedback signal; and controlling said first laser in response to said adjusted feedback signal.

4. The method according to claim 3 wherein said determining said value of said laser calibration factor and said optical bundle calibration factor comprises:

measuring a response slope of said second laser and said second optical bundle; and calculating said laser calibration factor and said optical bundle calibration factor in response to said response slope of said second laser and said second optical bundle.

5. A feedback control system for use with a plurality of laser sources and a plurality of optical bundles, one of said plurality of laser sources being operably coupled to one of said plurality of optical bundles for delivering a laser light output, said feedback control system comprising:

an optical sensor outputting a raw feedback signal in response to a measured intensity of laser light output from said one of said plurality of laser sources;

a processing unit receiving said raw feedback signal, said processing unit multiplying said raw feedback signal by a laser calibration factor and a bundle calibration factor to produce an adjusted feedback signal, said laser calibration factor and said bundle calibration factor being determined through a statistical sampling of a plurality of laser and optical bundle combinations, said laser calibration factor representing an attribute of said one of said plurality of laser sources and an attribute of the coupling of said one of said plurality of laser sources with said plurality of optical bundles, said optical bundle calibration factor representing an attribute of said one of said plurality of optical bundles and an attribute of the coupling of said one of said plurality of optical bundles with said plurality of laser sources; and a controller receiving said adjusted feedback signal, said controller in communication with said one of said plurality of laser sources so as to control the output of said one of said plurality of laser sources in response to said adjusted feedback signal.

6. The feedback control system according to claim 5 wherein said optical sensor is a photodiode.

7. A method of feedback control of a laser system, said laser system comprising a laser and an optical bundle, said laser being operably coupled to said optical bundle, said method comprising:

measuring a response slope of a sample of laser and optical bundle combinations;

calculating a laser calibration factor and an optical bundle calibration factor based upon said response slope of said laser and optical bundle combinations;

outputting a laser beam from the laser to the optical bundle;

measuring an intensity of said laser beam; and controlling said laser in response to said measured intensity of said laser beam, said laser calibration factor, and said optical bundle calibration factor.

8. The method according to claim 7 wherein said measured intensity of said laser beam is measured between said laser and said optical bundle.

9. The method according to claim 7 further comprising outputting a raw feedback signal in response to said measured intensity of said laser beam.

10. The method according to claim 9 wherein said controlling said laser in response to said measured intensity of said laser beam, said laser calibration factor, and said optical bundle calibration factor comprises multiplying said raw feedback signal by said laser calibration factor and said optical bundle calibration factor to obtain an adjusted feedback signal.

11. A feedback control system for use with a laser source and an optical bundle, said laser source being operably coupled to said optical bundle for delivering a laser light output, said feedback control system comprising:

an optical sensor outputting a raw feedback signal in response to a measured intensity of laser light output from said laser source;

a processing unit receiving said raw feedback signal from said optical sensor, said processing unit outputting an adjusted feedback signal based upon said raw feedback signal, a laser calibration factor, and a bundle calibration factor; and a controller receiving said adjusted feedback signal, said controller being in communication with said laser source so as to control the output of said laser source in response to said feedback signal wherein said laser calibration factor and said bundle calibration factor are determined through a statistical sampling.

12. The feedback control system according to claim 11 wherein said optical sensor is connected between said laser source and said optical bundle.

13. The feedback control system according to claim 11 wherein said processing unit multiplies said raw feedback signal by said laser calibration factor and said bundle calibration factor to produce said adjusted feedback signal.

14. The feedback control system according to claim 11 wherein said optical sensor is a photodiode.

* * * * *